US011542857B1

(12) United States Patent
Yu et al.

(10) Patent No.: US 11,542,857 B1
(45) Date of Patent: Jan. 3, 2023

(54) SCAVENGED PRE-CHAMBER USING OXYGEN GENERATED BY A MOLECULAR SIEVE PROCESS

(71) Applicant: SAUDI ARABIAN OIL COMPANY, Dhahran (SA)

(72) Inventors: Xin Yu, New Hudson, MI (US); Andrew Baur, Whitmore Lake, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/378,352

(22) Filed: Jul. 16, 2021

(51) Int. Cl.
*F02B 19/18* (2006.01)
*F02B 19/12* (2006.01)
*B01D 39/20* (2006.01)
*B01D 53/04* (2006.01)

(52) U.S. Cl.
CPC ............. *F02B 19/18* (2013.01); *B01D 39/20* (2013.01); *B01D 53/0407* (2013.01); *F02B 19/12* (2013.01); *B01D 2253/108* (2013.01); *B01D 2256/12* (2013.01); *B01D 2257/102* (2013.01); *B01D 2257/504* (2013.01)

(58) Field of Classification Search
CPC ......... F02B 19/18; F02B 19/12; B01D 39/20; B01D 53/0407; B01D 2253/108; B01D 2256/12; B01D 2257/102; B01D 2257/504
See application file for complete search history.

(56) References Cited

U.S. PATENT DOCUMENTS

| 3,909,202 | A | * | 9/1975 | Becker ................... G01N 31/12 436/139 |
| 4,765,293 | A | * | 8/1988 | Gonzalez .................. F02F 3/02 123/262 |
| 6,116,208 | A | | 9/2000 | Nishimura et al. |
| 6,141,960 | A | | 11/2000 | Takami et al. |
| 6,325,041 | B1 | | 12/2001 | Mamiya et al. |
| 6,352,068 | B1 | | 3/2002 | Jacobsen |
| 8,016,925 | B2 | | 9/2011 | McCombs et al. |

(Continued)

FOREIGN PATENT DOCUMENTS

| AT | 13417 U1 | 12/2013 |
| CN | 106703973 A * | 5/2017 |

(Continued)

OTHER PUBLICATIONS

Megías-Sayago, Cristina et al., "CO2 Adsorption Capacities in Zeolites and Layered Double Hydroxide Materials"; Frontiers in Chemistry; vol. 7, Article 551; pp. 1-10; Aug. 6, 2019 (10 pages).

(Continued)

*Primary Examiner* — Joseph J Dallo
(74) *Attorney, Agent, or Firm* — Osha Bergman Watanabe & Burton LLP

(57) ABSTRACT

A method includes providing an internal combustion engine having a combustion chamber, a piston movably disposed in the combustion chamber, and a prechamber connected to the combustion chamber via a flow port. The method further includes forcing a gas mixture from the combustion chamber through a zeolite material to the prechamber using a compression stroke of the piston, where the zeolite material filters the gas mixture to provide an oxygen rich gas into the prechamber.

20 Claims, 9 Drawing Sheets

(56) References Cited

U.S. PATENT DOCUMENTS

| | | |
|---|---|---|
| 8,925,518 B1 | 1/2015 | Riley et al. |
| 2002/0104518 A1 | 8/2002 | Keefer et al. |
| 2005/0235631 A1* | 10/2005 | Schumann ......... G01N 27/4075 |
| | | 422/177 |
| 2011/0005501 A1 | 1/2011 | Eberhard |
| 2011/0131952 A1 | 6/2011 | Onodera et al. |
| 2016/0230645 A1 | 8/2016 | Schock et al. |
| 2016/0245235 A1 | 8/2016 | Jung |
| 2021/0033013 A1* | 2/2021 | Fujita ................... F01N 3/2066 |

FOREIGN PATENT DOCUMENTS

| | | |
|---|---|---|
| JP | 4568991 B2 | 10/2010 |
| WO | 2019/027800 A2 | 2/2019 |

OTHER PUBLICATIONS

Gopinath, R. et al., "Development of Oxygen Separation Unit for Emission Control in IC Engine Using Zeolite 5A"; Journal of Industrial Pollution Control; vol. 33, Issue 2; pp. 1789-1793; Dec. 2017 (5 pages).

Hamed, Hussien H., "Oxygen Separation from Air Using Zeolite Type 5A"; International Journal of Scientific & Engineering Research; vol. 6, Issue 5; pp. 597-602; May 2015 (6 pages).

\* cited by examiner

SCAVENGED PRE-CHAMBER USING OXYGEN GENERATED BY A MOLECULAR SIEVE PROCESS

BACKGROUND

Internal combustion engines may generally operate by combusting a fuel mixture within a combustion chamber, where the combustion may force movement of one or more components in the engine. A typical internal combustion engine may include multiple cylinders defining the combustion chambers within an engine block, where combustion within a cylinder moves an internal piston, which may in turn move a crankshaft of the engine. A fuel mixture may be directed through an inlet into the combustion chamber and combusted.

Combustion within a combustion chamber of an internal combustion engine may be generated using different mechanisms, such as using high pressure and high temperature conditions or using an ignition device. A common ignition device set up requires a continuous ignition source, or spark, to be produced such that combustion is created by sparking an air and fuel mixture in the combustion chamber of the engine. Conventionally, the spark is created by energizing a copper ignition rod and placing the energized ignition rod within a set distance to a grounded nickel or iridium plate, where the electrical difference between the energized ignition rod and the grounded plate creates a continuous spark. Alternatively, a portion of the air and fuel mixture may be ignited in a pre-combustion chamber, where the air and fuel mixture is ignited and the resulting combustion reaction is released into the main combustion chamber to ignite the remainder of the air and fuel mixture.

After combustion within the combustion chamber, the combustion products may exit an outlet of the combustion chamber as exhaust. Some internal combustion engines use exhaust gas recirculation (EGR) techniques that recirculate a portion of an engine's exhaust back to the combustion chamber for mixture with the fuel. By recirculating exhaust gases back to the combustion chamber of an internal combustion engine, EGR systems may be used to dilute the amount of oxygen present during combustion, thereby lowering combustion temperatures in the combustion chamber and lowering nitrous oxides ($NO_x$) emissions from the engine.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to methods that include providing an internal combustion engine having a combustion chamber, a piston movably disposed in the combustion chamber, and a prechamber connected to the combustion chamber via a flow port, and forcing a gas mixture from the combustion chamber through a zeolite material to the prechamber using a compression stroke of the piston, wherein the zeolite material filters the gas mixture to provide an oxygen rich gas into the prechamber.

In another aspect, embodiments of the present disclosure relate to internal combustion chambers that include a piston movably disposed in a combustion chamber, an intake port to the combustion chamber, an exhaust port to the combustion chamber, and a prechamber filter system fluidly connected to the combustion chamber via at least one flow port, wherein the prechamber filter system includes a prechamber and a zeolite material positioned between the prechamber and the combustion chamber.

In yet another aspect, embodiments disclosed herein relate to internal combustion engines that include a combustion chamber, a piston movably disposed in the combustion chamber, a prechamber in fluid communication with the combustion chamber via a prechamber flow port, a prechamber valve positioned in the prechamber flow port and interfacing with the combustion chamber, wherein changes in pressure in the combustion chamber activates the prechamber valve, and a zeolite material positioned between the prechamber and the combustion chamber.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments disclosed herein provide methods, systems, and apparatuses for utilizing the increased pressure from the compression stroke of a piston in an engine cylinder to direct a gas mixture from the cylinder's combustion chamber to a prechamber filter system. A prechamber filter system may include a prechamber and zeolite material. Zeolite material may be incorporated into the prechamber filter system to filter oxygen from the combustion chamber gas mixture as the gas mixture is directed through the zeolite filter. In such manner, pressure from the compression stroke in a combustion chamber may force a gas mixture through a zeolite filter of a prechamber filter system to provide an oxygen rich environment in the prechamber. The oxygen rich environment in the prechamber may then be ignited, and combustion in the prechamber may be directed into the combustion chamber for initiation of the combustion stroke.

A prechamber filter system may have zeolite material provided in different configurations to filter a combustion chamber gas mixture as the gas mixture is pushed through the zeolite filter and into a prechamber. For example, a prechamber filter system may have zeolite material provided as a zeolite filter separate and spaced apart from the prechamber, where a combustion chamber gas mixture may be forced through the zeolite filter, and the filtered, oxygen rich gas may then be directed through at least one flow path and into the prechamber. In some prechamber filter systems, zeolite material may form one or more walls between a prechamber and an adjacent combustion chamber, where a combustion chamber gas mixture may be forced through the zeolite filter wall to be filtered prior to entering the prechamber.

Figure 1:
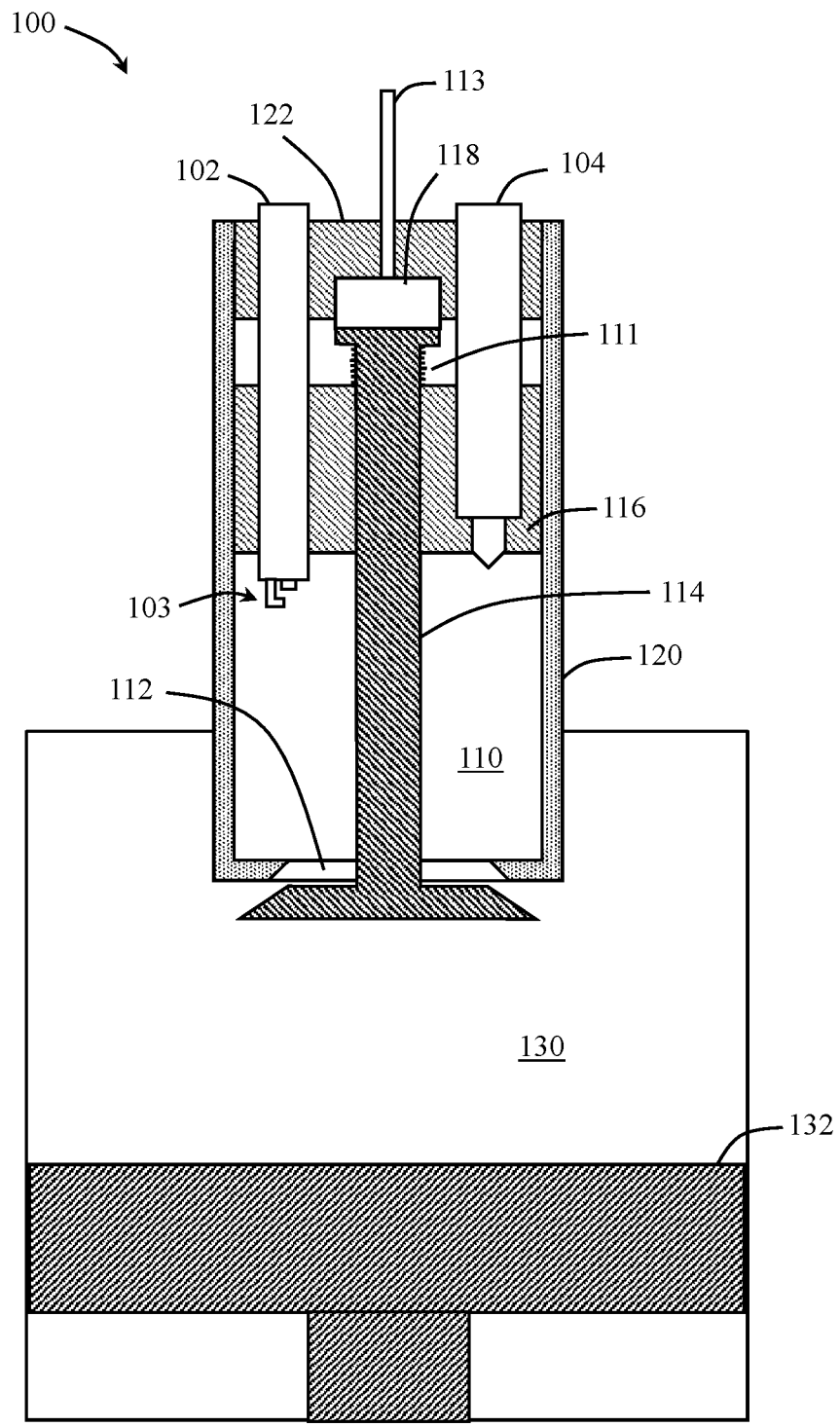
FIG. 1 shows a cross-sectional view of a prechamber filter system according to embodiments of the present disclosure.

For example, FIG. 1 shows an example of a prechamber filter system 100 having a prechamber 110 and a zeolite material forming a housing 120 around the prechamber 110. The housing 120 walls formed of zeolite material may act as a zeolite filter between the prechamber 110 and an adjacent combustion chamber 130. In the embodiment shown, the housing 120 may protrude into the combustion chamber 130. In some embodiments, a zeolite wall of a prechamber housing may be flush with an inner wall of the combustion chamber.

The prechamber filter system 100 may be fluidly connected to the adjacent combustion chamber 130 via a prechamber flow port 112 positioned between the prechamber 110 and the combustion chamber 130. The prechamber flow port 112 may be an opening formed in the prechamber housing 120 that may be sealed with a prechamber valve 114. The prechamber valve 114 may be positioned in the prechamber flow port 112 to interface with the combustion chamber 130. Changes in pressure in the combustion chamber 130 may activate the prechamber valve 114 to open and close the prechamber flow port 112. When the prechamber valve 114 is in the open position, gas may flow through the prechamber flow port 112, and when the prechamber valve 114 is in the closed position, gas may be prevented from flowing through the prechamber flow port 112.

The prechamber 110 may have a volume smaller than the volume of the adjacent combustion chamber 130. For example, a prechamber 110 may have a volume that is between about 0.2% to about 1% of the displacement volume of the combustion chamber 130.

The prechamber housing 120 may have a valve guide 116 disposed therein, where the prechamber valve 114 may extend from the prechamber flow port 112 through the housing 120 and through the valve guide 116. The prechamber 110 may be defined within the housing 120 between the zeolite walls and the valve guide 116.

A valve actuator 118 may be provided outside of the prechamber 110 at an upper axial end of the prechamber valve 114 opposite the prechamber flow port 112 and may be configured to move the prechamber valve 114 to an open and closed position. Additionally, a spring 111 may be provided between an upper surface of the valve guide 116 and the upper axial end of the prechamber valve 114. The valve actuator 118 and the spring 111 may be enclosed within the prechamber housing 120 by a prechamber cap 122.

The valve actuator 118 may be activated (e.g., via electrical signals through wires 113) to exert a downward force on the prechamber valve 114 to move the prechamber valve 114 to an open position, where the prechamber flow port 112 is open. The spring 111 may exert an upward force on the prechamber valve 114. When the valve actuator 118 is not activated, the spring 111 force may move the prechamber valve 114 to a closed position, where the prechamber flow port 114 is sealed by the prechamber valve 114. The spring 111 may be preloaded and have a spring force that is slightly lower than the force generated by the valve actuator 118, such that the prechamber valve 114 may be controlled to be in an open position when the differential pressure between the prechamber 110 and the combustion chamber 130 during an intake stroke is small.

The prechamber filter system 100 may further include an ignition device 102 (e.g., a spark plug) and a fuel injector 104. The ignition device 102 may be part of a larger ignition system with the fuel injector 104 that injects fuel into the prechamber 110. The ignition device 102 may extend axially through the prechamber cap 122 and through the valve guide 116 such that an ignition end 103 is exposed to the prechamber 110 (e.g., flush with an inner wall of the prechamber 110 or protruding into the prechamber 110). By providing an ignition device 102 that extends from outside of the prechamber housing 120 to interface with the prechamber 110, the ignition device 102 may be removed from outside of the housing 120 to be repaired or replaced, and when the ignition device 102 is installed, the ignition end 103 may be in a position to ignite gases within the prechamber 110.

The fuel injector 104 may also extend axially through the prechamber cap 122 and through the valve guide 116 to interface with the prechamber 110. Fuel may be directed through the fuel injector 104 and into the prechamber 110, where the injected fuel may mix with prechamber gases. A prechamber filter system 100 according to embodiments of the present disclosure may have other configurations of a fuel injector extending through the prechamber housing to provide fuel into a mixture of gas held within the prechamber.

The ignition device 102 and fuel injector 104 may operate at a timing corresponding to operation of the prechamber valve 114. The prechamber valve 114 may operate at a timing controlled by a combination of pressure changes in the adjacent combustion chamber 130 and the valve actuator 118. Pressure changes in the combustion chamber 130 may occur from a piston 132 cycling within the combustion chamber 130 during an intake stroke, a compression stroke, a combustion (or power) stroke, and an exhaust stroke. For example, relative differences in pressure within the prechamber 110 and the adjacent combustion chamber 130 when the piston 132 is in the intake and combustion strokes may open the prechamber valve 114, and pressure differentials between the prechamber 110 and adjacent combustion chamber 130 when the piston 132 is in the compression stroke, exhaust stroke, and during part of the combustion stroke may close the prechamber valve 114. The valve actuator 118 may be operated to open and close the prechamber valve 114 during times in which the pressure differentials between the prechamber 110 and adjacent combustion chamber 130 do not provide adequate force to keep the prechamber valve 114 in a selected position.

For example, FIGS. 2A-D show an example of a piston cycle in an internal combustion engine 140 having a prechamber filter system 100 according to embodiments of the present disclosure. The engine includes at least one cylinder defining a combustion chamber 130, a piston 132 movably disposed in the combustion chamber 130, a prechamber 110 in fluid communication with the combustion chamber 130 via a prechamber flow port 112, a prechamber valve 114 positioned in the prechamber flow port 112 and interfacing with the combustion chamber 130, and a zeolite material in the form of a wall of the prechamber housing 120 positioned between the prechamber 110 and the combustion chamber 130.

Changes in pressure in the combustion chamber 130 may activate the prechamber valve 114 to open and close during the piston cycle and operate a spark ignited combustion reaction through the prechamber 110 and the combustion chamber 130. For example, according to embodiments of the present disclosure, a method of operating the engine 140 may include sliding the piston 132 axially back and forth through the combustion chamber 130 (e.g., using a crankshaft 134 and connecting rod) in four strokes: an intake stroke (shown in FIG. 2A), a compression stroke (shown in FIG. 2B), a combustion stroke (shown in FIG. 2C, and sometimes referred to as the power stroke), and an exhaust stroke (shown in FIG. 2D). The intake and combustion strokes include the full travel of the piston 132 through the combustion chamber 130 in a direction from the prechamber filter system 100 toward the crankshaft 134, and the compression and exhaust strokes include the full travel of the piston 132 through the combustion chamber 130 in the opposite direction. As the piston 132 cycles in the engine cylinder, an intake valve 136 and exhaust valve 138 may be opened and closed according to the stroke of the piston 132 to let an air-fuel mixture into the combustion chamber 130 for combustion and to eject exhaust gases out of the combustion chamber 130 after combustion.

The piston 132 begins the intake stroke at top dead center ("TDC"), where the piston 132 is at the absolute top of the stroke. During the intake stroke, the piston 132 may be actuated in tandem with the opening of an intake valve 136, which may pull a stoichiometric air-fuel mixture into the combustion chamber 130. In some embodiments, an EGR (exhaust gas return) system 150 may be connected to the air-intake system of the engine 140, such that exhaust gas from the EGR system 150 may enter the combustion chamber 130 with an air-fuel mixture through the intake valve 136. In such embodiments, an air-fuel mixture and an exhaust gas may be directed through an intake port of the combustion chamber 130 during the intake stroke to provide a gas mixture in the combustion chamber 130. The prechamber valve 114 may be opened during the intake stroke by a valve actuator 118 as the piston 132 slides from the TDC position toward a bottom dead center ("BDC") position (where BDC is the position of the piston 132 at the lowest point in the stroke). While the prechamber valve 114 is open during the intake stroke of the piston 132, some of the gas mixture in the combustion chamber 130 may flow through the prechamber flow port 112 into the prechamber 110.

At the end of the intake stroke, the prechamber valve 114 may be closed by the valve actuator 118. The pressure differential between the prechamber 110 and the combustion chamber 130 may drive a small portion of the gas mixture in the combustion chamber 130 through the zeolite material housing 120 to provide a relatively oxygen rich gas in the prechamber 110. The exhaust valve 138 of the combustion chamber 130 may be kept closed during the intake stroke to prevent exhaust gases from entering the combustion chamber 130 and to maintain a desired pressure differential between the prechamber 110 and combustion chamber 130.

Figure 2A:
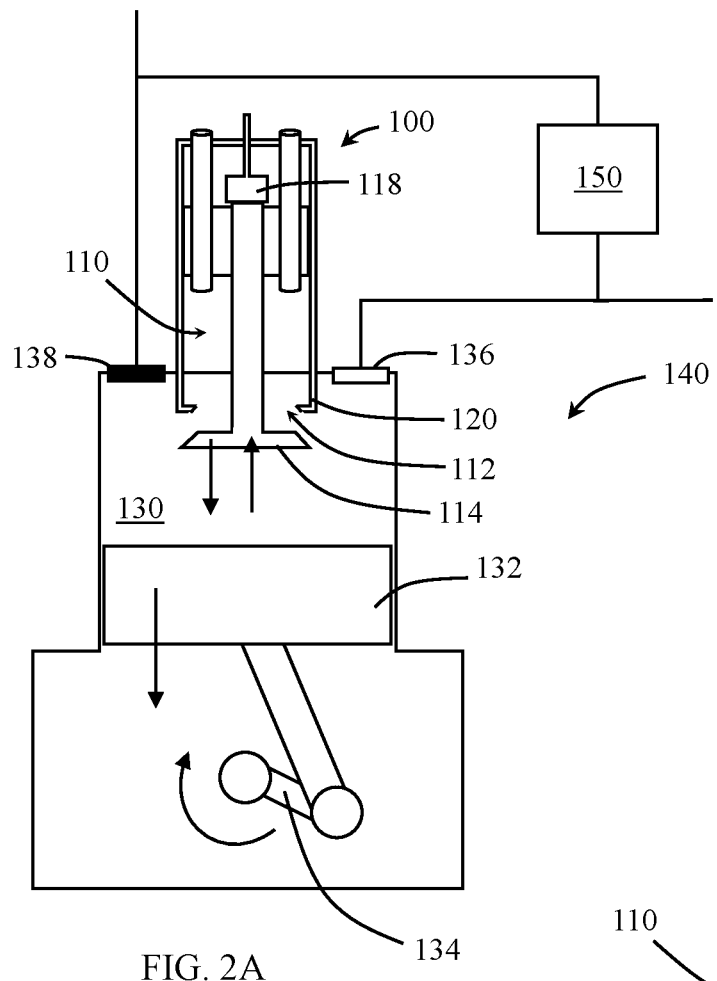
FIGS. 2A-D show a piston cycle using a prechamber filter system according to embodiments of the present disclosure.
Figure 2B:
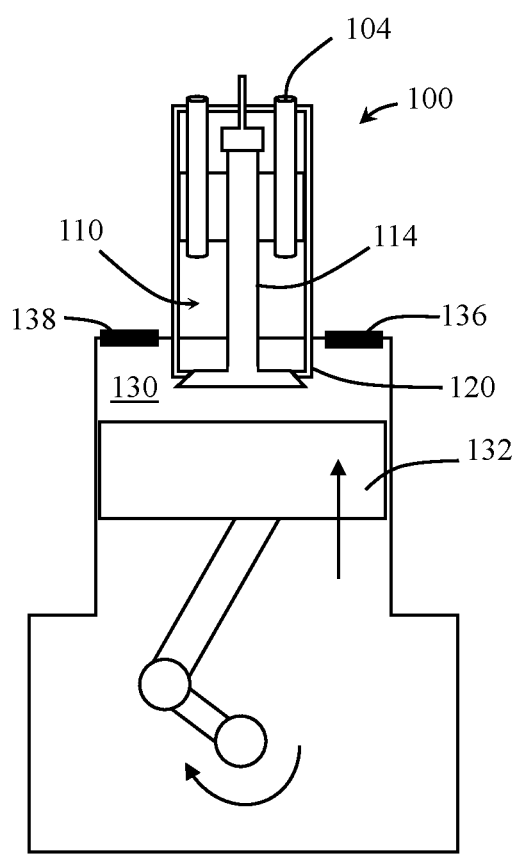

At the end of the intake stroke, the piston 132 begins the compression stroke at the BDC of the engine cylinder. As shown in FIG. 2B, during the compression stroke, the intake valve 136 may be closed and the piston 132 actuated to compress the gas mixture in the combustion chamber 130. While the piston 132 compresses the gas mixture, all valved openings to the combustion chamber 130 may remain in a closed position, including the intake valve 136, an exhaust valve 138, and the prechamber valve 114. Thus, during the compression stroke, the pressure in the combustion chamber 130 may increase as the piston 132 compresses the gas mixture. The increased pressure in the combustion chamber 130 may result in a pressure differential between the combustion chamber 130 and prechamber 110, where the gas mixture from the combustion chamber 130 may be forced through the zeolite material housing 120 of the prechamber 110. In such manner, the compression stroke of the piston 132 may be used to drive the gas mixture from the combustion chamber 130 through a zeolite material and directly to the prechamber 110. The zeolite material may filter the gas mixture to provide an oxygen rich gas in the prechamber 110.

According to embodiments of the present disclosure, zeolite material may include microporous aluminosilicate material having pore sizes large enough to allow oxygen and other smaller molecules to pass through the zeolite material but small enough to prevent nitrogen and carbon dioxide gases from passing through the zeolite material. Zeolite material may be used to form one or more walls dividing a combustion chamber from a prechamber in an engine according to embodiments of the present disclosure, where the zeolite material wall(s) may form an oxygen filter between the combustion chamber and prechamber. Thus, during the compression stroke, an oxygen rich gas may enter the prechamber from the zeolite wall, while nitrogen and other bigger gas molecules remain in the adjacent combustion chamber.

Additionally, during the compression stroke, fuel may be injected into the prechamber 110 from a fuel injector 104. The fuel and oxygen rich gas mixture within the prechamber 110 may then be ignited by an ignition device 102. As the combustion of the gas mixture within the prechamber 110 grows, the pressure within the prechamber 110 increases until the pressure forces open the prechamber valve 114. For example, in a prechamber filter system 100 having a spring (e.g., spring 111 shown in FIG. 1) exerting a force on the prechamber valve 114 in the closed position, combustion within the prechamber 110 may exert a pressure force on the prechamber valve 114 sufficient to overcome the spring force and open the prechamber valve 114.

Figure 2C:
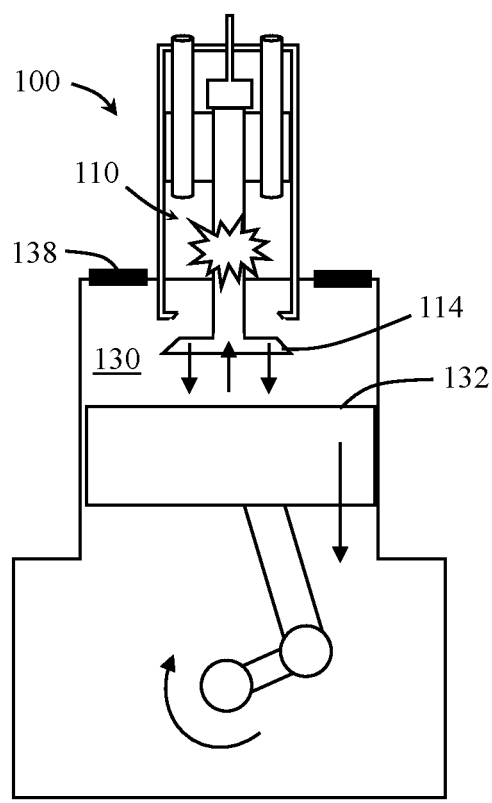
Figure 2D:
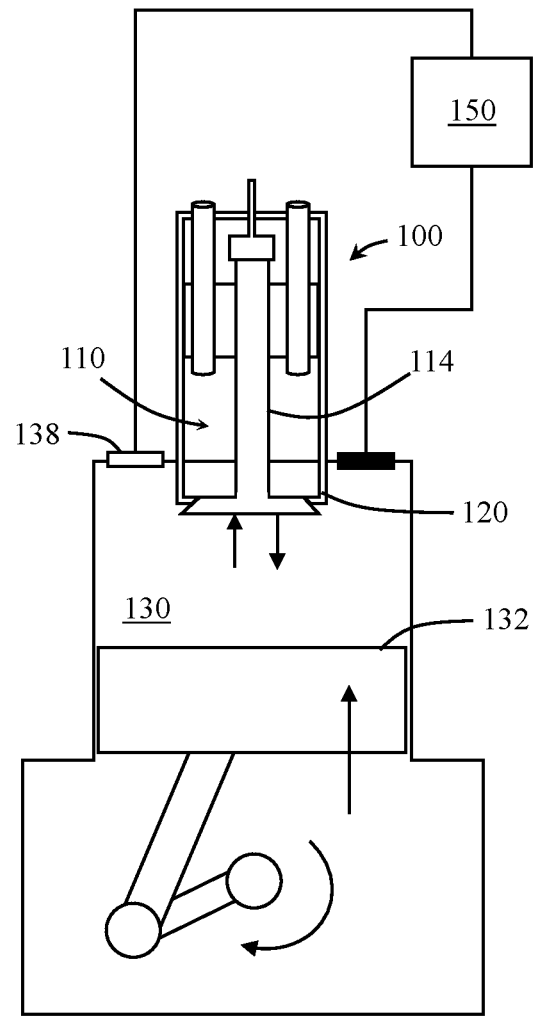

When combustion in the prechamber 110 opens the prechamber valve 114 between the prechamber 110 and the combustion chamber 130, the combustion reaction may spread into the combustion chamber 130, which ignites the gas mixture in the combustion chamber 130. The opening of the prechamber valve 114 and combustion ejection into the combustion chamber 130 begins the combustion stroke of the piston 132, as shown in FIG. 2C.

During the combustion stroke, the combustion of the gas mixture in the combustion chamber 130 continues, which increases the pressure in the combustion chamber 130. As the pressure in the combustion chamber 130 increases and exceeds the pressure in the prechamber 110, the combustion pressure in the combustion chamber 130 may close the prechamber valve 114 and thrust the piston 132 downward. The downward thrust of the piston 132 from the combustion may create work that is translated to an output shaft of the engine 140. After the prechamber valve 114 is closed, the combustion reaction in the combustion chamber 130 may continue and the pressure in the combustion chamber 130 may begin to decrease. As the pressure in the combustion chamber 130 decreases below the pressure in the prechamber 110, the pressure differential between the prechamber 110 and the adjacent combustion chamber 130 may drive the prechamber valve 114 again to the open position. As the pressure in the prechamber 110 and combustion chamber 130 equalizes, the prechamber valve 114 may be closed by an actuation mechanism or spring (e.g., spring 111 in FIG. 1).

As the piston 132 moves downward in the combustion stroke, the pressure in the combustion chamber 130 may decrease. When the pressure in the combustion chamber 130 reaches a similar or slightly higher pressure than the pressure in a fluidly connected exhaust manifold, e.g., connected through exhaust valve 138, the prechamber valve 114 may be opened (e.g., using a valve actuator 118 in FIG. 1) to allow the pressure in the prechamber 110 to equalize with the combustion chamber 130.

A combustion stroke in a piston cycle may experience dynamic pressure conditions as combustion occurs and as the piston 132 moves. Thus, the pressure difference between the prechamber 110 and the combustion chamber 130 may also dynamically change during the combustion stroke. As the pressure differential between the prechamber 110 and combustion chamber 130 changes, the prechamber valve 114 may be opened or closed according to the pressure differential between the chambers 110, 130. Thus, although the combustion stroke in FIG. 2C is described as having the prechamber valve 114 change positions three times (open, closed, open) due to changing pressure differentials, different combustion conditions may cause the prechamber valve 114 to have a different sequence of position changes.

During the exhaust stroke, the exhaust valve 138 may be opened, and the piston 132 may be actuated from BDC to TDC, forcing the exhaust gases from the combustion out of the open exhaust valve 138. Exhaust gas from the combustion chamber 130 may be directed through the exhaust valve to an EGR system 150 for recirculation of the exhaust gas or to an exhaust system that ejects the exhaust gas. Additionally, in some embodiments, the valve actuator 118 may act against the preloaded spring 111 force to open the prechamber valve 118 to scavenge the combustion product gases. At the end of the exhaust stroke, the piston 132 is at TDC and the cycle may restart with the intake stroke.

In the piston cycle described relative to the embodiment shown in FIGS. 2A-D, a prechamber valve 114 between a prechamber 110 and adjacent combustion chamber 130 may be controlled by both pressure change in the combustion chamber and at least one valve actuation mechanism (e.g., a valve actuator 118 and spring 111 shown in FIG. 1). In other embodiments, a prechamber valve between a prechamber and adjacent combustion chamber may be controlled entirely by valve actuation mechanisms. Regardless of how valves to the combustion chamber 130 are opened and closed, embodiments of the present disclosure may include using increased pressure in the combustion chamber 130 during the compression stroke to filter the gas mixture within the combustion chamber 130 through a zeolite material wall (e.g., the prechamber housing 120) separating the combustion chamber 130 from the prechamber 110 in order to provide an oxygen rich gas mixture in the prechamber 110.

In some embodiments, rather than providing zeolite material as a wall separating the combustion chamber from the prechamber pressure, zeolite material may be provided in other configurations within a flow path between the combustion chamber and a prechamber, where the compression stroke of a piston may be used to filter the combustion chamber gas mixture through the zeolite material and into the prechamber.

Figure 3:
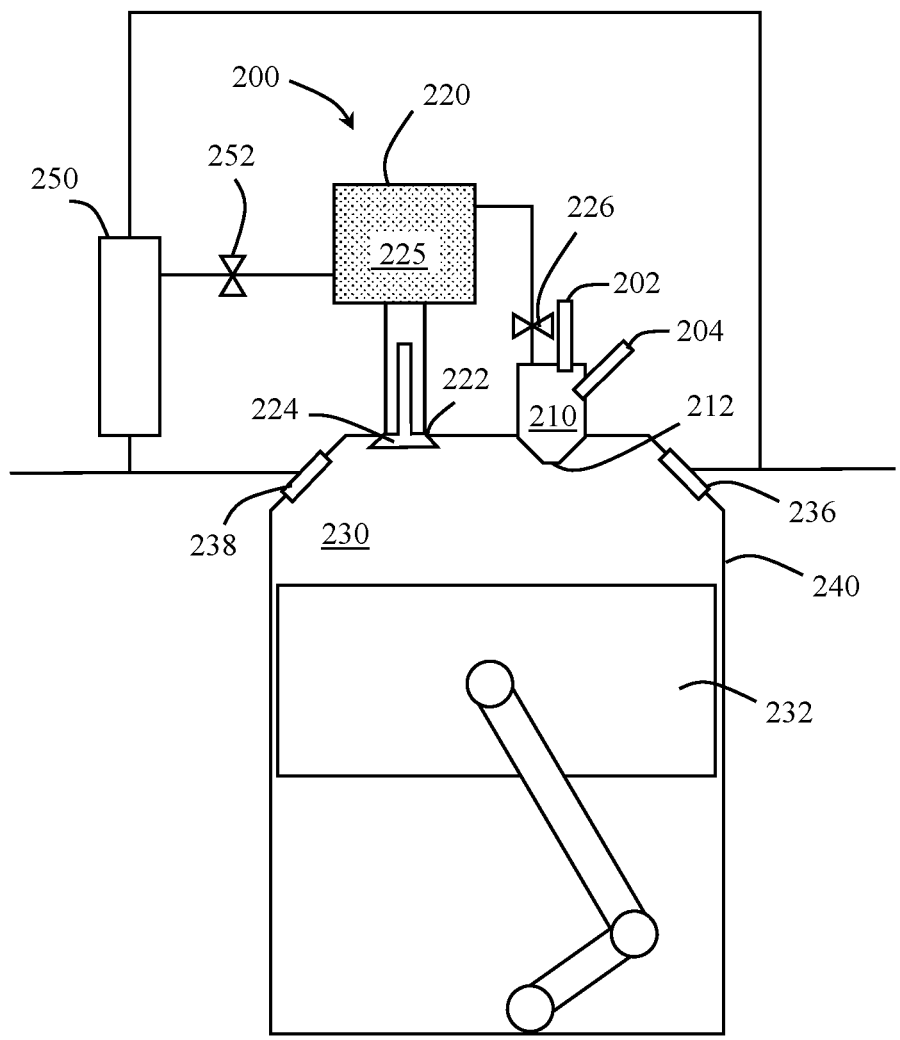
FIG. 3 shows a diagram of a prechamber filter system connected to an engine cylinder according to embodiments of the present disclosure.

For example, referring to FIG. 3, another configuration of a prechamber filter system 200 according to embodiments of the present disclosure is shown. The prechamber filter system 200 may be connected to a cylinder 240 of an internal combustion engine to have at least one flow port fluidly connecting the combustion chamber 230 within the engine cylinder to the prechamber filter system 200. For example, in the embodiment shown, the prechamber filter system 200 may be fluidly connected to the combustion chamber 230 via a prechamber flow port 212 and a filter flow port 222.

The prechamber filter system 200 may include a prechamber 210 and a zeolite material 225 positioned between the prechamber 210 and the combustion chamber 230. In the embodiment shown, the zeolite material 225 may be held within a zeolite chamber 220 that is positioned along a flow path between the combustion chamber 230 and the prechamber 210, such that the zeolite chamber 220 (and zeolite material 225 therein) are in fluid communication with the prechamber 210 and the combustion chamber 230. A zeolite chamber valve 224 may be positioned between the zeolite chamber 220 and the combustion chamber 230 to selectively open and close the flow path between the zeolite chamber 220 and the combustion chamber 230. The zeolite chamber valve 224 may be operated, for example, using a valve actuator such as a solenoid actuator.

Additionally, an exchange valve 226 may be positioned between the zeolite chamber 220 and the prechamber 210 to selectively open and close the flow path between the zeolite chamber 220 and the prechamber 210. The exchange valve 226 may be an actuated valve. In some embodiments, the exchange valve may be operated to minimize back pressure build up from the zeolite chamber 220 and maintain a selected flow of filtered gas from the zeolite chamber 220 to the prechamber 210.

The prechamber 210 may have an ignition device 202 and a fuel injector 204 attached to and interfacing with the prechamber 210. The fuel injector 204 may inject fuel into the prechamber 210 and the ignition device 202 (e.g., a spark plug) may provide a spark or flame to ignite the fuel mixture in the prechamber 210.

Figure 6:
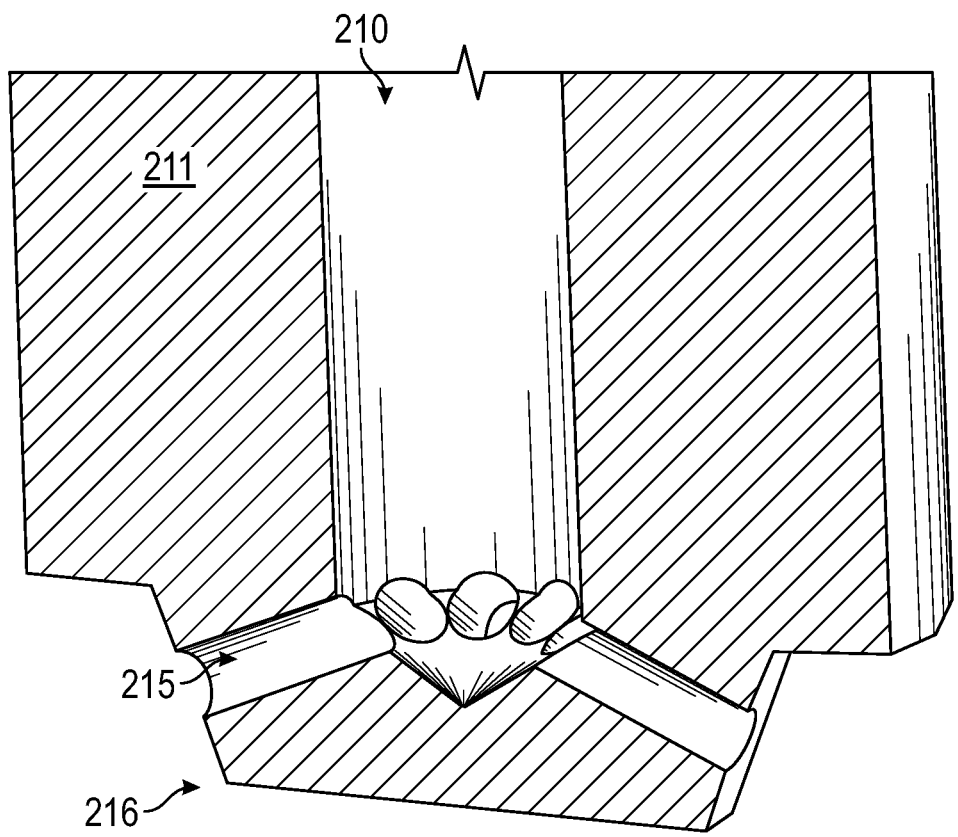
FIG. 6 shows cross-sectional view of an interfacing end of a prechamber according to embodiments of the present disclosure.

Additionally, in one or more embodiments, the prechamber flow port 212 may include one or more nozzles to allow flow from the prechamber 210 to the combustion chamber 230. For example, FIG. 6 shows an example of a portion of a prechamber housing 211 having at least one nozzle 215 formed at an interfacing end 216 of the prechamber 210 with the combustion chamber 230. Combustion products from a prechamber combustion may flow through the nozzle 215 flow paths from the prechamber 210 to the adjacent combustion chamber 230. The pressure in the prechamber 210 may be lower than in the adjacent combustion chamber 230 due to the relatively smaller size of the nozzle 215, which may help gas flow through the zeolite material and prevent oxygen rich gas flow into the combustion chamber 230.

A piston 232 may be movably disposed in the combustion chamber 230. The combustion chamber 230 may also include an intake port 236 and an exhaust port 238, both of which may be opened and closed using valves. The intake port 236 may be fluidly connected to an intake manifold, where a mixture of at least one of air, fuel, and recirculated exhaust gases may be directed from the intake manifold through the intake port 236 to enter the combustion chamber 230. The exhaust port 238 may be fluidly connected to an EGR system 250, which may recirculate exhaust gases back to the engine cylinder(s) and eject exhaust gases from the engine. The EGR system 250 may also be connected to the zeolite chamber 220, where an EGR valve 252 may be positioned between the zeolite chamber 220 and the EGR system 250 to selectively open and close the flow path between the zeolite chamber 220 and EGR system 250.

Zeolite material 225 may be provided in the form of pellets that are held within the zeolite chamber 220. For example, zeolite pellets may have a size allowing for a plurality of pieces of zeolite material to fill the zeolite chamber 220, and may vary depending on the size of the engine and zeolite chamber 220. Zeolite pellet material may have a pore size of about 3 Angstrom, which may allow oxygen (having a molecular size of about 0.299 nm) to pass through and nitrogen (having a molecular size of about 0.305 nm) to be trapped.

Further, FIG. 3 shows a single cylinder 240 and prechamber filter system 200 of an engine. However, according to embodiments of the present disclosure, engines may include at least one additional combustion chamber and at least one additional prechamber filter system, where each additional prechamber filter system is fluidly connected to each additional combustion chamber. For example, an engine may include four cylinders or six cylinders, where each cylinder may have a prechamber filter system according to embodiments disclosed herein may be fluidly connected thereto. In some embodiments, a multi-cylinder engine may include a prechamber filter system having a single zeolite filter (e.g., a zeolite chamber) and multiple prechambers, where each prechamber may be associated with each cylinder in the multi-cylinder engine, and channels or passageways may connect air flow through the single filter with each of the prechambers.

In embodiments having a zeolite material 225 provided in a flow path between a prechamber 210 and a combustion chamber 230, such as shown in FIG. 3, the compression stroke of the piston 232 in the combustion chamber 230 may be used to force a gas mixture from the combustion chamber 230 to the zeolite material 225 to be filtered. Additionally, a series of valves may be opened and closed in conjunction with the strokes of the piston in the piston cycle to allow gas mixtures to flow between the combustion chamber 230, zeolite chamber 220, and prechamber 210.

Figure 4A:
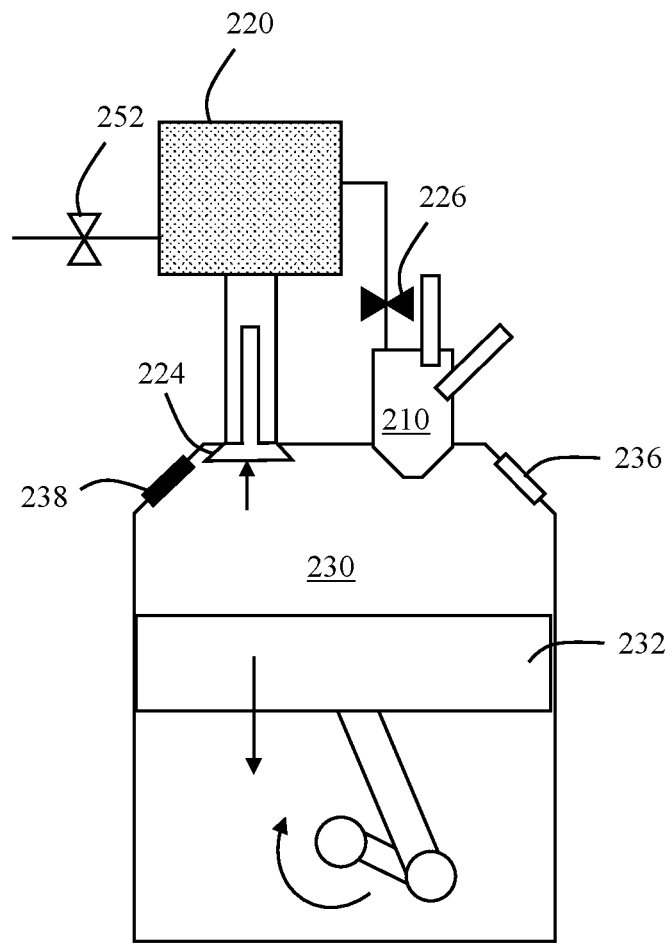
FIG. 4A shows the assembly of FIG. 3 during the piston intake stroke.

For example, FIGS. 4A-F show an example of a piston cycle of the engine shown in FIG. 3, including a example of valve timing corresponding with the piston cycle that allows a gas mixture from the combustion chamber 230 to be filtered and directed into the prechamber 210. As shown in FIG. 4A, during the intake stroke, the intake port 236 may be open to allow a gas mixture (e.g., air, fuel, and EGR gas) to be directed into the combustion chamber 230. As the piston 232 moves from a TDC position to a BDC position, the gas mixture may be drawn into the combustion chamber 230, while the exhaust port 238 may be closed to prevent the gas mixture from escaping the combustion chamber 230. During the intake stroke, the zeolite chamber valve 224 and the exchange valve 226 may be closed, and the EGR valve 252 may be open to allow residual gas in the zeolite chamber 220 to equalize with the EGR system 250.

Figure 4B:
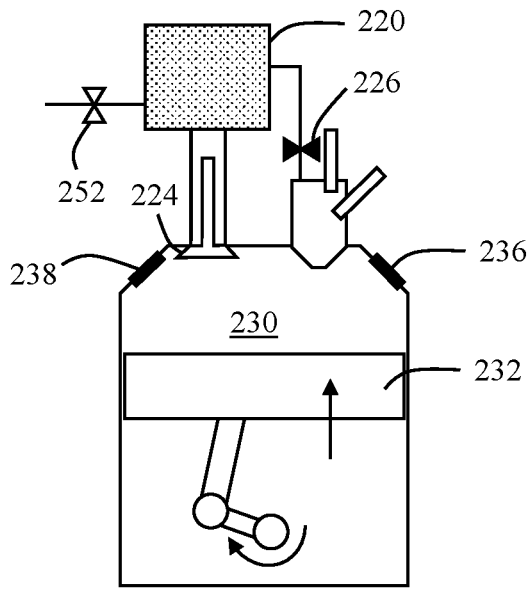
FIGS. 4B-D show the assembly of FIG. 3 during the piston compression stroke.

After the intake stroke, the piston 232 begins the compression stroke, as shown in FIG. 4B. During the compression stroke, the intake and exhaust ports 236, 238 may be closed, the zeolite chamber valve 224 and exchange valve 226 may remain closed, the EGR valve 252 may remain open, and the piston 232 may begin to move upward from the BDC position. As the piston 232 moves upward, the gas mixture within the combustion chamber 230 is compressed and the pressure increases.

Figure 4C:
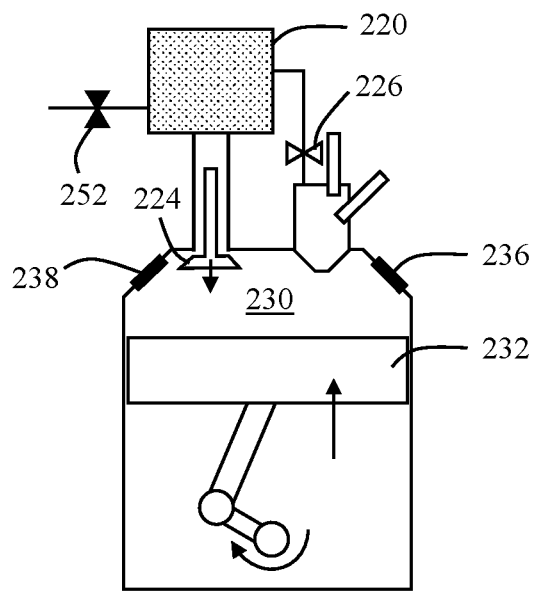

As shown in FIG. 4C, once the compression stroke begins, the EGR valve 252 may be closed. After the EGR valve 252 is closed, as the compression stroke continues and pressure in the combustion chamber 230 begins to build, the zeolite chamber valve 224 and the exchange valve 226 may be opened (e.g., using valve actuation mechanisms) to perform a filter phase of the compression stroke. In the filter phase of the compression stroke, the increased pressure in the combustion chamber 230 and the opened zeolite chamber and exchange valves 224, 226 allow gas flow from the combustion chamber 230, through the zeolite chamber 220 to be filtered, and to the prechamber 210. As the gas mixture is directed through the zeolite material 225 in the zeolite chamber 220, oxygen and other smaller molecules may pass through the zeolite material 225, while other gases and larger molecules are trapped. In other words, when the zeolite chamber and exchange valves 224, 226 are opened, the compression stroke may drive a gas mixture in the combustion chamber 230 to the zeolite chamber 220 to be filtered through the zeolite material 225, and an oxygen rich gas filtered from the gas mixture may continue to flow from the zeolite chamber 220 into the prechamber 210.

Figure 4D:
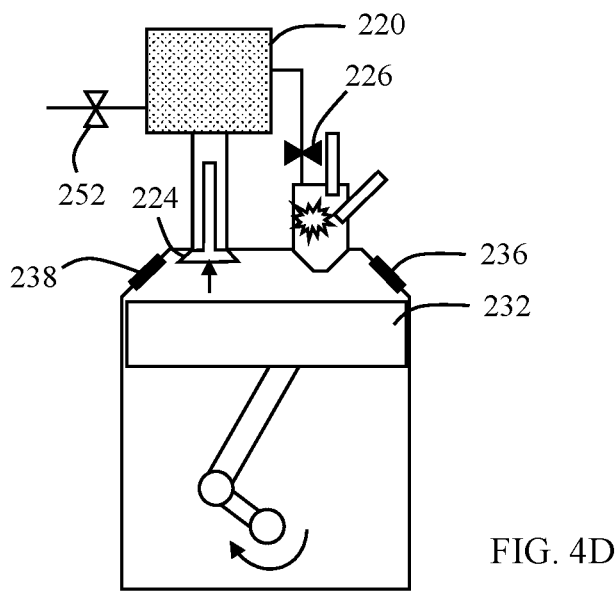

As shown in FIG. 4D, an injection phase of the compression stroke may include injecting fuel from a fuel injector 204 into the prechamber 210 to mix with the oxygen rich gas mixture. Fuel may be injected into the prechamber 210 in an amount to provide a stochiometric or slightly richer than stochiometric ratio of fuel to the oxygen rich gas mixture. In some embodiments, fuel may supplied to the prechamber 210 from the combustion chamber 230 through nozzles 215 of the prechamber in addition to or in the alternative to being supplied from a fuel injector 204. The ratio of the source of fuel supplied into the prechamber 210 may depend on different operating conditions of the engine.

After fuel has been injected into the prechamber 210, near the end of the compression stroke, the zeolite chamber valve 224 and exchange valve 226 may be closed, and the EGR valve 252 may be opened to allow the trapped residual gas from the zeolite chamber 220 to exit (e.g., and flow to an EGR system 250). An ignition device 202 may then ignite the fuel and oxygen rich gas mixture in the prechamber 210. The prechamber combustion may cause the pressure in the prechamber 210 to increase, and combustion gases may be ejected into the combustion chamber 230 for initiation of the combustion stroke of the piston 232.

Figure 4E:
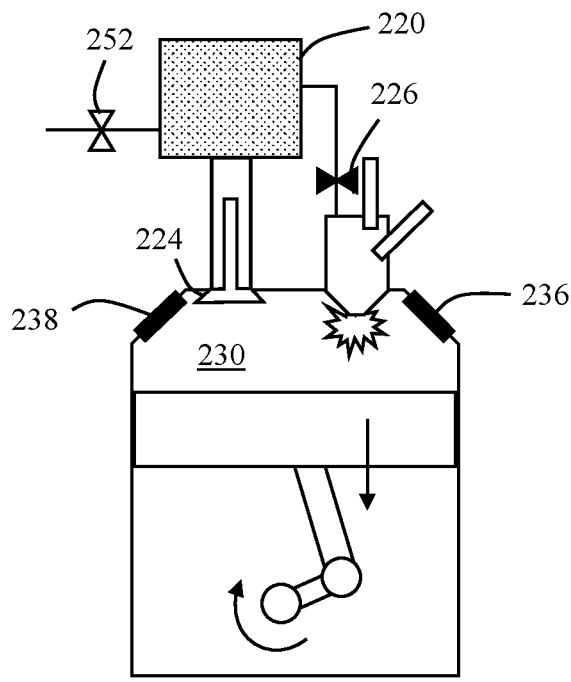
FIG. 4E shows the assembly of FIG. 3 during the piston combustion stroke.

As shown in FIG. 4E, the gas mixture remaining in the combustion chamber 230 may be ignited by the prechamber combustion, and the combustion may proceed in the combustion chamber 230 during the combustion stroke. As the combustion stroke continues and the piston 232 moves toward BDC, the pressure in the combustion chamber 230 may begin to decrease. The valves may be kept in the same position as they were in the ignition phase of the compression stroke, where the EGR valve 252 is open and the zeolite chamber valve 224 and exchange valve 226 are closed.

Figure 4F:
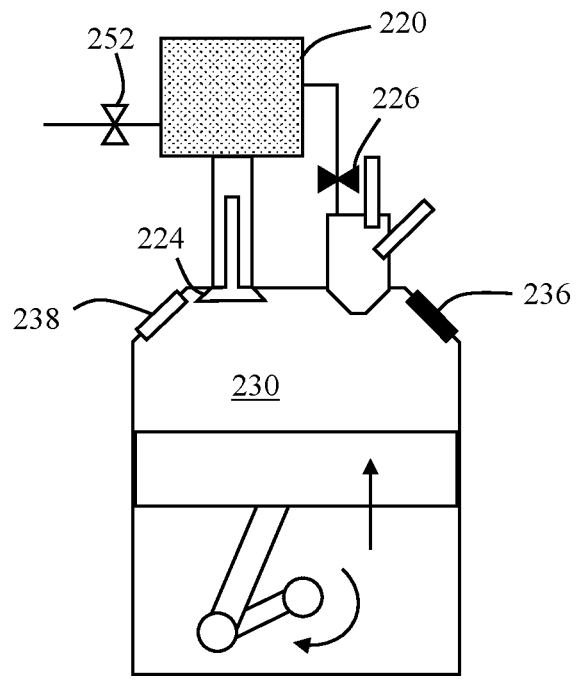
FIG. 4F shows the assembly of FIG. 3 during the piston exhaust stroke.

As shown in FIG. 4F, after the combustion stroke, the piston 232 may begin the exhaust stroke, where the piston 232 is moved from BDC to TDC. The exhaust port 238 is open during the exhaust stroke to allow exhaust gases from the combustion to exit the combustion chamber 230. During the exhaust stroke, the EGR valve 252 may remain open and the zeolite chamber valve 224 and exchange valve 226 may remain closed. In some embodiments, exhaust gas from the exhaust stroke may be directed to an EGR system 250. After the exhaust stroke, the piston cycle may be repeated, as shown in FIGS. 4A-F.

According to embodiments of the present disclosure, different configurations of a prechamber filter system may be associated with a cylinder of an internal combustion engine in order to use the compression stroke of the piston in the cylinder to filter and drive an oxygen rich gas into a prechamber.

Figure 5:
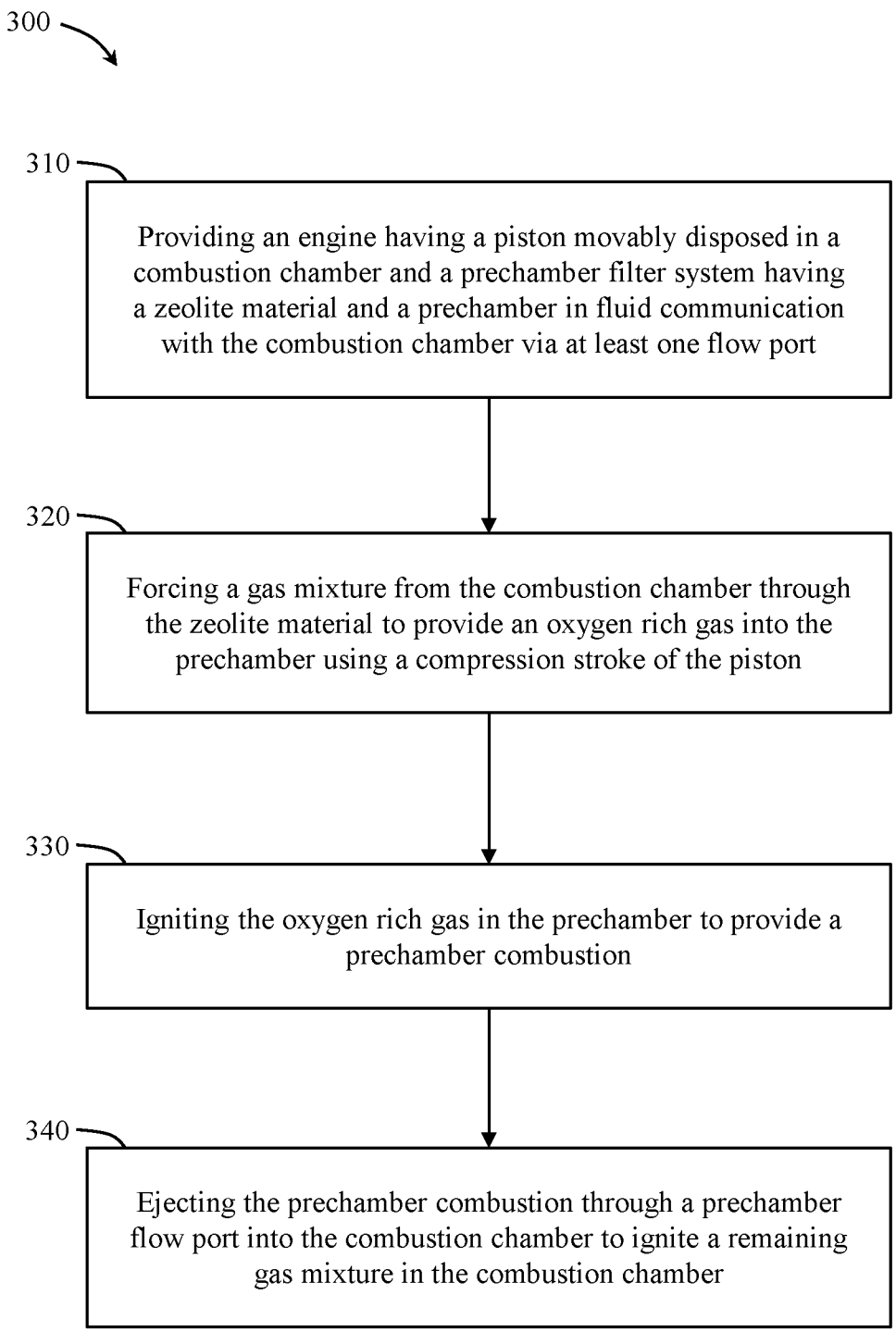
FIG. 5 shows a method according to embodiments of the present disclosure.

FIG. 5 shows an example of a method 300 according to embodiments of the present disclosure that includes using the compression stroke of a piston to filter a combustion chamber gas mixture through a zeolite material. When using the method 300, an engine may be provided (step 310), where the engine includes a piston movably disposed in at least one combustion chamber. Each combustion chamber may have an associated prechamber filter system having a zeolite material and a prechamber in fluid communication with the combustion chamber via at least a flow port.

The zeolite material may be provided in a flow path between the combustion chamber and the prechamber. For example, a zeolite chamber may be provided along a flow path between the combustion chamber and the prechamber, where the zeolite chamber contains zeolite material in fluid communication with the prechamber and the combustion chamber. A zeolite chamber valve may be positioned between the zeolite chamber and the combustion chamber to selectively allow gas flow from the combustion chamber to the zeolite material, and an exchange valve may be positioned between the zeolite chamber and the prechamber to selectively allow gas flow from the zeolite material to the prechamber. In some embodiments, zeolite material may be formed as one or more walls provided in the flow path between the combustion chamber and the prechamber.

Methods 300 may further include forcing a gas mixture from the combustion chamber through the zeolite material to provide an oxygen rich gas into the prechamber using a compression stroke of the piston (step 320). For example, a combustion chamber gas mixture may be filtered through a zeolite wall separating the combustion chamber from a prechamber using increased pressure from a compression stroke of a piston within the combustion chamber. In some embodiments, a gas mixture in the combustion chamber may be forced through one or more flow paths having a zeolite material positioned therein and fluidly connected to a prechamber using pressure from the compression stroke. For example, when zeolite material is provided in a zeolite chamber along a flow path extending between the combustion chamber and the prechamber, a method may include opening a zeolite chamber valve during the compression stroke of the piston to allow the gas mixture from the combustion chamber to flow into the zeolite chamber, directing the oxygen rich gas filtered from the zeolite chamber into the prechamber, and closing an exchange valve between the zeolite chamber and the prechamber to close the oxygen rich gas in the prechamber.

After an oxygen rich gas is filtered from the zeolite material filter and directed into the prechamber, the oxygen rich gas in the prechamber may be ignited to create a prechamber combustion (step 330). For example, in some embodiments, a spark plug assembled to the prechamber may be used to ignite the oxygen rich gas in the prechamber.

After initiating the prechamber combustion, the prechamber combustion may be ejected from the prechamber into the combustion chamber to ignite a remaining gas mixture in the combustion chamber (step 340). According to embodiments of the present disclosure, a prechamber may be directly adjacent the combustion chamber, where a prechamber combustion may be ejected through a flow port formed between the prechamber and the combustion chamber. In some embodiments, a prechamber may be connected to a combustion chamber through a flow path, where the prechamber combustion may be ejected through the flow path and flow port formed between the prechamber and the combustion chamber.

After combustion in the combustion chamber, exhaust gas from the combustion chamber may be directed through an exhaust port of the combustion chamber during an exhaust stroke of the piston. The exhaust gases may be directed to, for example, an exhaust system for removing combusted air and fuel gases, a turbocharging system that injects compressed air into the cylinder, an EGR system, or any combination thereof.

According to embodiments of the present disclosure, a gas mixture from a combustion chamber may be directed through a connected zeolite filter to provide an oxygen rich gas mixture within a prechamber that is fluidly connected to the main combustion chamber of the engine cylinder. By providing an oxygen rich gas mixture in a prechamber of the engine cylinder, the oxygen may be ignited in a separate combustion from the main combustion chamber. The separate prechamber combustion may then be used to create a combustion in the adjacent main combustion chamber of the engine cylinder. In contrast to conventional methods of directing an oxygen rich gas to a main combustion chamber of an engine, embodiments disclosed herein have a prechamber integrated with the engine system that may collect and ignite the oxygen rich gas mixture. In conventional systems having an oxygen rich gas mixture combusted in the main combustion chamber of a cylinder, the system may experience a large pressure drop when collecting the oxygen rich gas mixture in the main combustion chamber. However, by collecting an oxygen rich gas mixture in an associated prechamber (which may have a smaller volume than that of the main combustion chamber), the flow rate of the gas mixture into the prechamber may be relatively lower, which may reduce the impact of a large pressure drop otherwise experienced in conventional systems.

Further, breaking up the combustion process into two stages may improve dilution tolerance within the main combustion chamber of the engine cylinder. Increasing dilution tolerance can improve engine efficiency due to reduced pumping, heat transfer, and gas property losses while also reducing $NO_x$ emission due to reduced combustion temperature. A scavenged prechamber having a filtered oxygen rich gas provided therein can be used to enhance the ignitibility of the mixture inside a prechamber during high EGR stoichiometric operations, which may significantly improve the dilution tolerance of the main chamber combustion process.

Advantageously, by using systems and methods disclosed herein, high pressure gas available from an engine's cylinder during a compression stroke may be utilized to move and filter a gas mixture to a prechamber rather than using an external compressor or pump.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

The invention claimed is:

1. A method, comprising:
providing an internal combustion engine, comprising:
a combustion chamber;
a piston movably disposed in the combustion chamber; and
a prechamber connected to the combustion chamber via a flow port; and
forcing a gas mixture from the combustion chamber through a zeolite material to the prechamber using a compression stroke of the piston,
wherein the zeolite material filters the gas mixture to provide an oxygen rich gas into the prechamber.

2. The method of claim 1, further comprising:
igniting the oxygen rich gas in the prechamber to provide a prechamber combustion; and
ejecting the prechamber combustion through the flow port into the combustion chamber to ignite a remaining gas mixture in the combustion chamber.

3. The method of claim 2, wherein exhaust gas from the combustion chamber is directed through an exhaust port of the combustion chamber during an exhaust stroke of the piston.

4. The method of claim 2, wherein a spark plug is used to ignite the oxygen rich gas in the prechamber.

5. The method of claim 2, wherein during a combustion stroke of the piston, a prechamber valve to the flow port is closed and opened as a pressure differential between the combustion chamber and the prechamber changes.

6. The method of claim 1, wherein the prechamber comprises a housing made of the zeolite material, and wherein the method further comprises:
opening a prechamber valve to the flow port during an intake stroke of the piston;
directing an air-fuel mixture and an exhaust gas through an intake port of the combustion chamber during the intake stroke to provide the gas mixture in the combustion chamber; and
closing the prechamber valve at an end of the intake stroke;
wherein the gas mixture in the combustion chamber is forced through the zeolite material housing to provide the oxygen rich gas in the prechamber.

7. The method of claim 1, further comprising injecting an amount of fuel into the prechamber during the compression stroke.

8. The method of claim 1, wherein the zeolite material is held in a zeolite chamber fluidly connected to the prechamber, and wherein the method further comprises:
opening a zeolite chamber valve during the compression stroke of the piston to allow the gas mixture from the combustion chamber to flow into the zeolite chamber;
directing the oxygen rich gas filtered from the zeolite chamber into the prechamber;
closing an exchange valve between the zeolite chamber and the prechamber to close the oxygen rich gas in the prechamber;
igniting the oxygen rich gas in the prechamber to provide a prechamber combustion; and
ejecting the prechamber combustion through the flow port into the combustion chamber to ignite a remaining gas mixture in the combustion chamber.

9. An internal combustion engine, comprising:
a piston movably disposed in a combustion chamber, the combustion chamber comprising:
an intake port;
an exhaust port; and
at least one flow port; and
a prechamber filter system fluidly connected to the combustion chamber via the at least one flow port, wherein the prechamber filter system comprises:
a prechamber;
a prechamber valve positioned in the at least one flow port, wherein changes in pressure in the combustion chamber activates the prechamber valve; and
a zeolite material positioned between the prechamber and the combustion chamber.

10. The engine of claim 9, further comprising:
a zeolite chamber in fluid communication with the prechamber and the combustion chamber, the zeolite chamber containing the zeolite material;
a zeolite chamber valve positioned between the zeolite chamber and the combustion chamber; and
an exchange valve positioned between the zeolite chamber and the prechamber.

11. The engine of claim 10, further comprising an exhaust gas recirculation system connected to the combustion chamber and the zeolite chamber, wherein an exhaust gas recirculation valve is positioned between the zeolite chamber and the exhaust gas recirculation system.

12. The engine of claim 10, wherein the zeolite material is in the form of pellets held within the zeolite chamber.

13. The engine of claim 9, wherein an ignition device is attached to and interfaces with the prechamber.

14. The engine of claim 9, wherein a fuel injector is attached to and interfaces with the prechamber.

15. The engine of claim 9, wherein the zeolite material forms a housing of the prechamber.

16. The engine of claim 9, further comprising:
at least one additional combustion chamber; and
at least one additional prechamber filter system, each additional prechamber filter system fluidly connected to each additional combustion chamber.

17. An internal combustion engine, comprising:
a combustion chamber;
a piston movably disposed in the combustion chamber;
a prechamber in fluid communication with the combustion chamber via a prechamber flow port;
a prechamber valve positioned in the prechamber flow port and interfacing with the combustion chamber, wherein changes in pressure in the combustion chamber activates the prechamber valve; and a zeolite material positioned between the prechamber and the combustion chamber.

18. The engine of claim 17, wherein the zeolite material forms a housing of the prechamber.

19. The engine of claim 17, further comprising:
a housing defining the prechamber;
a valve guide disposed in the housing, wherein the prechamber valve extends from the prechamber flow port through the housing and through the valve guide; and
a valve actuator provided at an axial end of the prechamber valve opposite the prechamber flow port.

20. The engine of claim 19, further comprising an ignition device and a fuel injector, the ignition device and the fuel injector positioned in the valve guide and interfacing with the prechamber.

\* \* \* \* \*